UNITED STATES PATENT OFFICE.

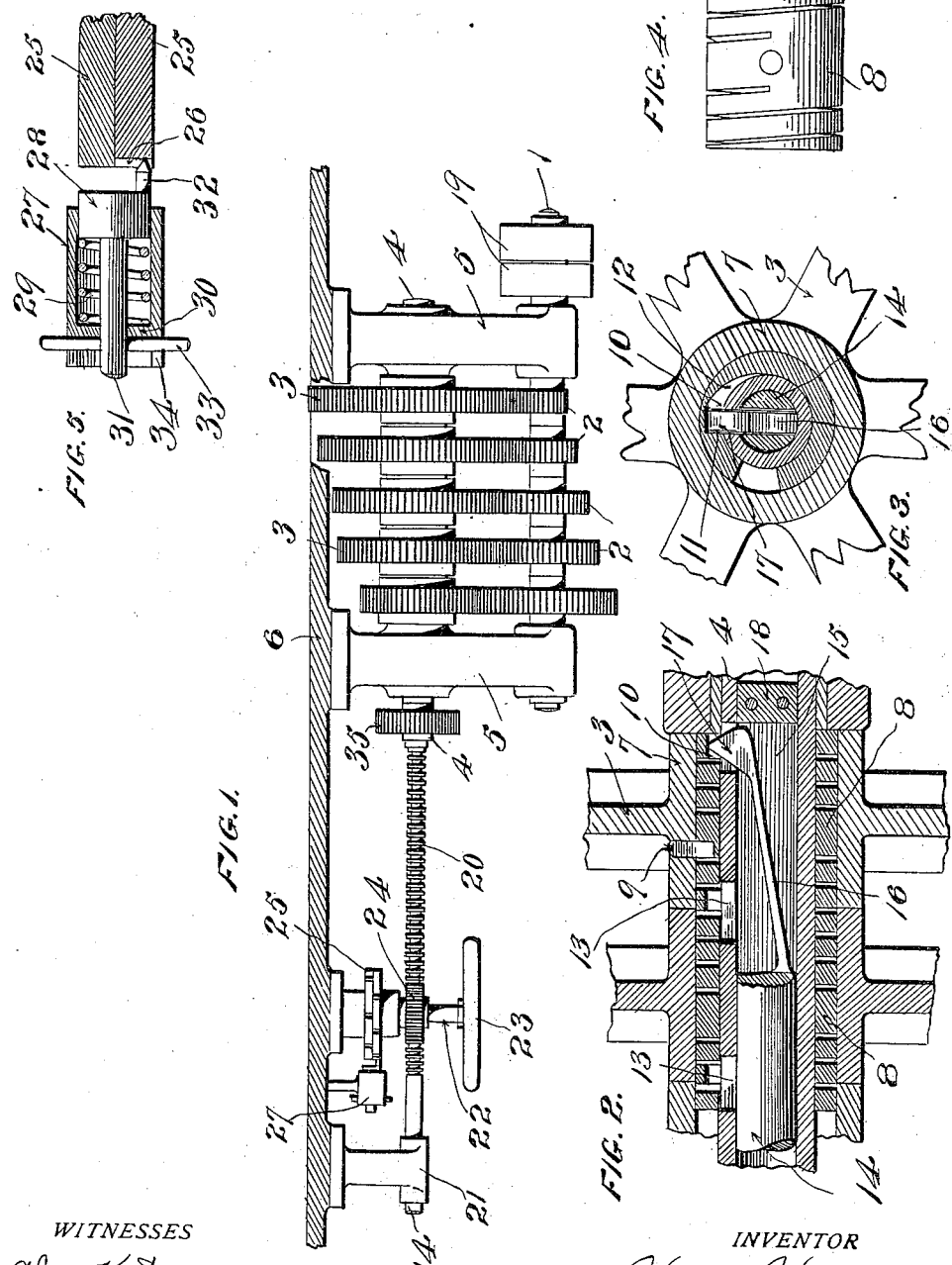

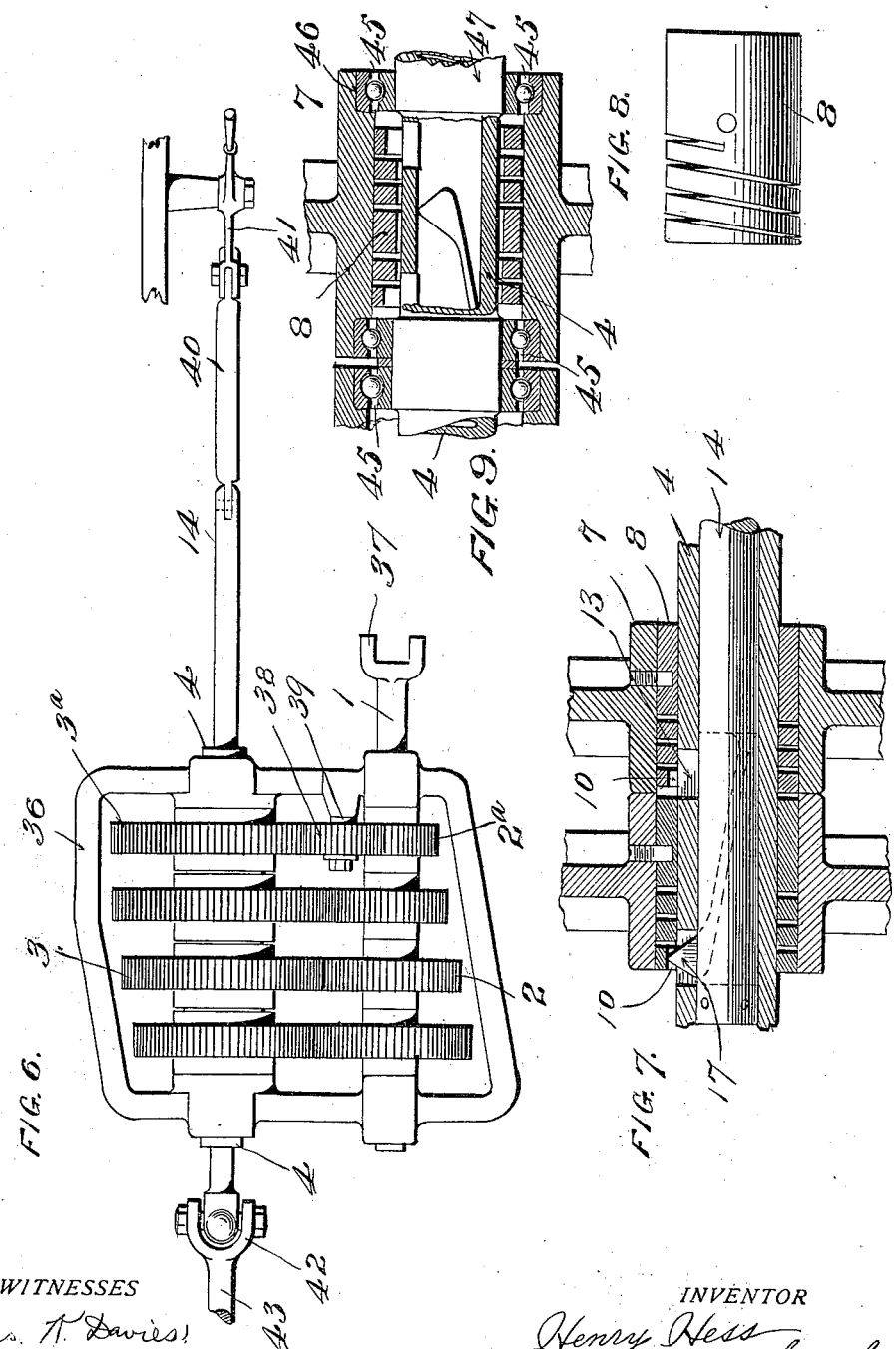

HENRY HESS, OF PHILADELPHIA, PENNSYLVANIA.

FRICTION-CLUTCH.

1,043,423.  Specification of Letters Patent.  Patented Nov. 5, 1912.

Original application filed July 18, 1903, Serial No. 166,201. Divided and this application filed October 17, 1907. Serial No. 397,809.

*To all whom it may concern:*

Be it known that I, HENRY HESS, a citizen of the United States, and resident of Philadelphia, in the State of Pennsylvania, have invented certain new and useful Improvements in Friction-Clutches, of which the following is a specification.

The present application is a division of my prior application Serial Number 166201, filed July 18, 1903, for milling machines.

That part of my invention covered herein relates to clutch mechanism applicable to machine tools, motor vehicles and other uses by slight changes within the ability of those skilled in the art.

The invention is capable of embodiment in many different forms.

Two exemplifications which are the best embodiments of the invention which I have at this time devised are hereinafter described.

In the accompanying drawing, Figures 1 to 5 inclusive show mechanism designed with especial reference to use in machine tools, and Figs. 6 to 8 inclusive show mechanism intended especially for use in motor vehicles. Fig. 1 is a plan view of mechanism embodying my invention; Fig. 2, a detail view in longitudinal section through the hollow shaft and gear hubs; Fig. 3, a transverse section through one of the free gear hubs; Fig. 4, a detail view of one of the clutch springs; Fig. 5, a detail view in section, of the stop; Fig. 6, a plan view of a modified form of the gearing; Fig. 7, a longitudinal section through the hollow shaft and free gear hubs of a modified form; and Fig. 8 is a detail view of a modified form of clutch spring. Fig. 9 is a sectional view of the hollow shaft and loose gears showing the bearings carrying the gears revolubly mounted upon the shaft and arranged to prevent wearing contact of the spring clutch members with the shaft when they are inoperative.

Referring first to Figs. 1 to 5 inclusive—reference numeral 1 designates a driving shaft to which are secured a stepped series of gears 2. Each gear 2 meshes with a corresponding gear 3 mounted loosely on a hollow shaft 4, which is the countershaft or driven shaft of the gearing. Shafts 1 and 4 are revolubly supported in any suitable manner, as by brackets 5 connected with the frame 6 of a machine tool. Within the hub 7 of each gear 3 and encircling hollow shaft 4 is a double clutch spring 8, fixed to the hub by a screw 9. Each of the springs of clutch 8 has near its end a notch 10 having one squared face 11 and one beveled face 12. The squarred faces 11 of the two springs of each clutch 8 face in opposite directions. Hollow shaft 4 is provided with a series of slots 13, one opposite the coil of each of the springs of each clutch 8 which carries one of the notches 10. The slots 13 which are arranged between two of the gears may be long enough to serve for both of the adjacent clutch members belonging to the two gears. Or they may be separate slots, one corresponding to the notch in the clutch member of each of the gears. A clutch-operating rod 14 slidably mounted within shaft 4 is provided at one end with a slot 15. A flat spring 16 connected to the rod at one end of the slot carries a tooth 17 at its other end, the tooth being beveled on its front and rear faces so that it readily slides in and out of slots 13 as the rod is moved back and forth in hollow shaft 4, and also shaped so that it will enter notches 10 in the clutch springs. The slotted end of rod 14 is closed by a plug 18, riveted in. Driving shaft 1 is to be impelled in forward or reverse directions as desired by means of pulleys 19 or other suitable driving mechanism. Gears 2 are keyed to the driving shaft and therefore rotate gears 3 on the counter-shaft. Clutch operating rod 14 is now slid along in hollow shaft 4 to connect the desired loose gear 3 with said shaft. As tooth 17 comes opposite slots 13 it enters them and if retained in the proper position as gears 3 revolve the tooth enters the notch 10 in the clutch member opposite which it has been placed. The notches in opposite ends of each clutch member are oppositely arranged so that each corresponds to one direction of rotation of the driving member and the loose gears are so arranged that the notches corresponding to the same direction of rotation are on the same relative side of all the gears. To connect the desired loose gear with the driven shaft, therefore, tooth 17 must be brought to rest opposite the notch corresponding to the direction in which the driver is rotating at the time. Suitable means are hereafter described for facilitating the positioning of the tooth. As the tooth is moved along its shaft it will enter the notches corresponding to the opposite direction of rotation of the driving member without effect. As the tooth enters these notches it encounters their beveled faces 12 which force the tooth back into the hollow shaft without causing any driving engagement of the clutch member with the tooth. As the tooth enters each notch corresponding to the present direction of rotation of the driving member, however, the rotation of the corresponding gear 3 shortly brings the squared face 11 of the notch against the tooth. Driven shaft 4 being under driving resistance, the first movement of the gear after the tooth encounters the squared face 11 of the notch serves to tighten or coil up the spring around the shaft. The spring thus acts as a clutch and engages the shaft with increasing firmness until the shaft revolves in unison with the gear. In addition to its function as a clutch the spring also forms a positive connection between the tooth and the gear. As soon as the tooth enters the notch in the spring, the gear begins to rotate the shaft under the yielding pull of the spring, and when the limit of the spring movement has been reached, the shaft is compelled to revolve as if rigidly impelled by the gear. The combined spring and clutch action of clutch members 8 serve to efficiently take up the shock incident to changing gears. Upon reversal of the direction of rotation of driving shaft 1, tooth 17 becomes effective to connect shaft 4 with the opposite springs of clutch members 8, corresponding to the new direction of rotation.

Means for moving clutch operating rod 14 will now be described.

A circular rack 20 of suitable length to permit the necessary motion is formed on the end of rod 14 which projects beyond hollow shaft 4. The free end of the rod is supported in a sleeve 21. Revolubly supported at right angles to rod 14 is a controlling shaft 22 on the end of which is secured a hand-wheel 23. Shaft 22 carries a pinion 24 engaging rack 20 and also carries two notched disks 25, the notches 26 in one disk corresponding to the position of shifting rod 14 for one direction of rotation of the driving shaft and the notches in the other disk corresponding to the opposite direction of rotation of the driving shaft. Adjacent to the disks a sleeve 27 supported by the frame 6 carries a plunger 28 pressed outward by a spring 29 confined between the plunger and abutment 30 in the sleeve. The plunger has a stem 31 protruding through a hole formed in the abutment. On its outer end the plunger carries a finger 32 having a beveled end adapted to enter notches 26. The finger is set off-center so that in one position of the plunger, as seen in Fig. 5, it engages the notches in one of disks 25, and if turned to the opposite position engages the notches in the other disk. The adjustment of the finger to engage the disk desired is effected by means of a cross-bar 33 passing through stem 31 and resting in opposite slots 34 in the corresponding end of sleeve 27. By using bar 33 as a handle and pulling it free from slots 34 it may be swung half way around and returned to the slots under the influence of spring 29. This brings finger 32 opposite the other disk. In whatever position 32 remains, the shape of its beveled end is such that on rotation of hand-wheel 23, the finger is forced out of notches 26 by slight effort and at the same time engages the notches with sufficient force to indicate to the operator the successive gear positions, and to retain the disks in stationary position when the hand-wheel is released by the operator. Slots 34 are of such depth that the necessary movement of plunger 28 when the disks are revolved is permitted without causing bar 33 to leave the slots. The motion of driven shaft 4 of the gearing is communicated to useful work by any suitable means, such, for example, as gear 35.

In Figs. 6, 7 and 8, a form of my invention especially adapted to use in motor vehicles is shown. Parts similar to those already described are similarly numbered, and their construction and operation need not be again pointed out. The gearing is conveniently mounted in a casing 36 of which the upper half is removed, as seen in Fig. 6. The driving shaft 1 is to be connected with the motor by means of a jaw 37 or in any other approved manner. The motor in motor vehicles which employ change speed gearing generally runs in one direction only. It is therefore necessary to provide means for reversing the direction of motion of the driven member of the gearing independent of the motor. Three sets of driving and driven gears 2, 3, of different ratios are provided for forward speeds, and another set 2$^a$, 3$^a$, connected by an idler 38 carried on stud-shaft 39 is provided for the reverse speed. Each of the driven gears 3, 3$^a$, is provided with a spring-clutch 8, but since the driving member revolves only in one direction and each of the driven gears is intended to transmit power in but one direction, only one spring is required on each spring-clutch, and the squared face of the notch 10 in the spring is arranged so as to impel the driven shaft in the forward direction in the case of forward gears and in the reverse direction in the case of reverse gear 3$^a$. The clutch sleeves 8 with single springs are shown in Figs. 7 and 8. Clutch shifting rod 14 is arranged to extend forward from hollow shaft 4 and is connected by means of a link 40 with a lever 41 or any other suitable mechanism by which it may be acted on by the driver of the vehicle. The driven shaft 4 is connected with the driving wheels through a universal joint 42 and shaft 43, or in any other suitable manner. It will be understood by those versed in the art that the motion of the driven shaft may be returned by means of gearing to a member coaxial with the driving shaft so that the axes of the driving member and actual driven member are identical, which permits a direct connection between the driving and driven members; also that the clutch mechanism may be arranged on the driving shaft instead of the counter shaft. If necessary, in motor vehicles, the usual master clutch may be interposed between the motor and driving shaft 1 of the gearing and this master clutch may be disengaged before clutch shifting rod 14 is moved from one position to another; but, in some cases, this is not essential.

In Fig. 9, the loose gears are shown mounted on ball bearings 45. The hubs 7 are extended and counter-bored at 46 to receive the outer bearing rings and the inner bearing rings are carried on shoulders 47 formed on hollow shaft 4. When gears 3 are running free on shaft 4, the bearings serve to reduce friction of this movement and they also carry the inner faces of clutch springs 8 clear of shaft 4, thus avoiding friction and wear against the springs and shaft which may occur in constructions like Figs. 2 and 7, where no ball bearings are employed. Instead of the ball bearings plain bushings may be inserted between hubs 7 and shaft 4 to take the wear off of the clutch springs.

I claim:

1. In clutch mechanism, the combination of a shaft, a rotatable member thereon provided with a hub, a yielding element within the hub positively connected at one end to the hub and arranged to frictionally engage the shaft, and means for positively connecting the free end of the clutch element with the shaft.

2. In clutch mechanism, the combination of a shaft, a member revoluble thereon and having a hub, a coil spring inclosed within said hub and connected to the hub at one end and free at the other end, and a member slidably arranged within the shaft and adapted to positively engage the free end of said spring.

3. In clutch mechanism, the combination of a shaft, a member revolubly mounted thereon and having a hub, a helical spring within the hub and coiled about the shaft and permanently connected to the member at one end and free at the other end, the free end of the spring having a beveled and shouldered recess and a clutch operating member slidable within said shaft and adapted to positively engage said recess.

4. In clutch mechanism, the combination of a shaft, a member revolubly mounted thereon and having a hub, a heavy helical spring inclosed within the hub and coiled about the shaft and connected to the member at one end and free at the other end, the free end of said spring having a beveled and shouldered recess, said shaft being provided with an aperture to register with said recess, and a spring pressed operating member slidable within the shaft and adapted to pass through the aperture and engage said recess.

HENRY HESS.

Witnesses:
C. D. McCalla,
Mary McCalla.

Copies of this patent may be obtained for five cents each, by addressing the "Commissioner of Patents, Washington, D. C."